United States Patent [19]

Savin-Czeizler et al.

[11] Patent Number: 4,502,721
[45] Date of Patent: Mar. 5, 1985

[54] GRIPPING DEVICE

[75] Inventors: Andrei Savin-Czeizler, Forest Hills, N.Y.; Kenneth Lang, Gillette, N.J.

[73] Assignee: Bristol-Myers Company, New York, N.Y.

[21] Appl. No.: 575,098

[22] Filed: Jan. 30, 1984

[51] Int. Cl.³ .............................................. B66C 1/02
[52] U.S. Cl. ..................................... 294/1.1; 294/64.3
[58] Field of Search ............. 294/1 R, 63 A, 64 B, 294/DIG. 2, 64 A; 271/97, 98, 195; 414/750, 751

[56] References Cited

U.S. PATENT DOCUMENTS

| | | | |
|---|---|---|---|
| 2,772,792 | 12/1956 | Lakso | 414/107 |
| 3,300,019 | 1/1967 | Brigham et al. | 198/25 |
| 3,488,674 | 1/1970 | Simjian | 51/217 |
| 3,721,472 | 3/1973 | Mammel | 294/64 B |
| 3,779,401 | 12/1973 | Carroll | 414/751 |
| 4,002,254 | 1/1977 | Olofsen | 294/64 B |
| 4,274,800 | 6/1981 | Tsuruka | 414/750 |

Primary Examiner—James B. Marbert
Attorney, Agent, or Firm—Gabriel P. Katona

[57] ABSTRACT

A gripping device having, generally, a U shape and provided with opposing legs; one leg having a cutout to accommodate the object to be gripped; the other leg having means for directing jets of gas towards its opposing leg to maintain the object to be gripped in place.

5 Claims, 6 Drawing Figures

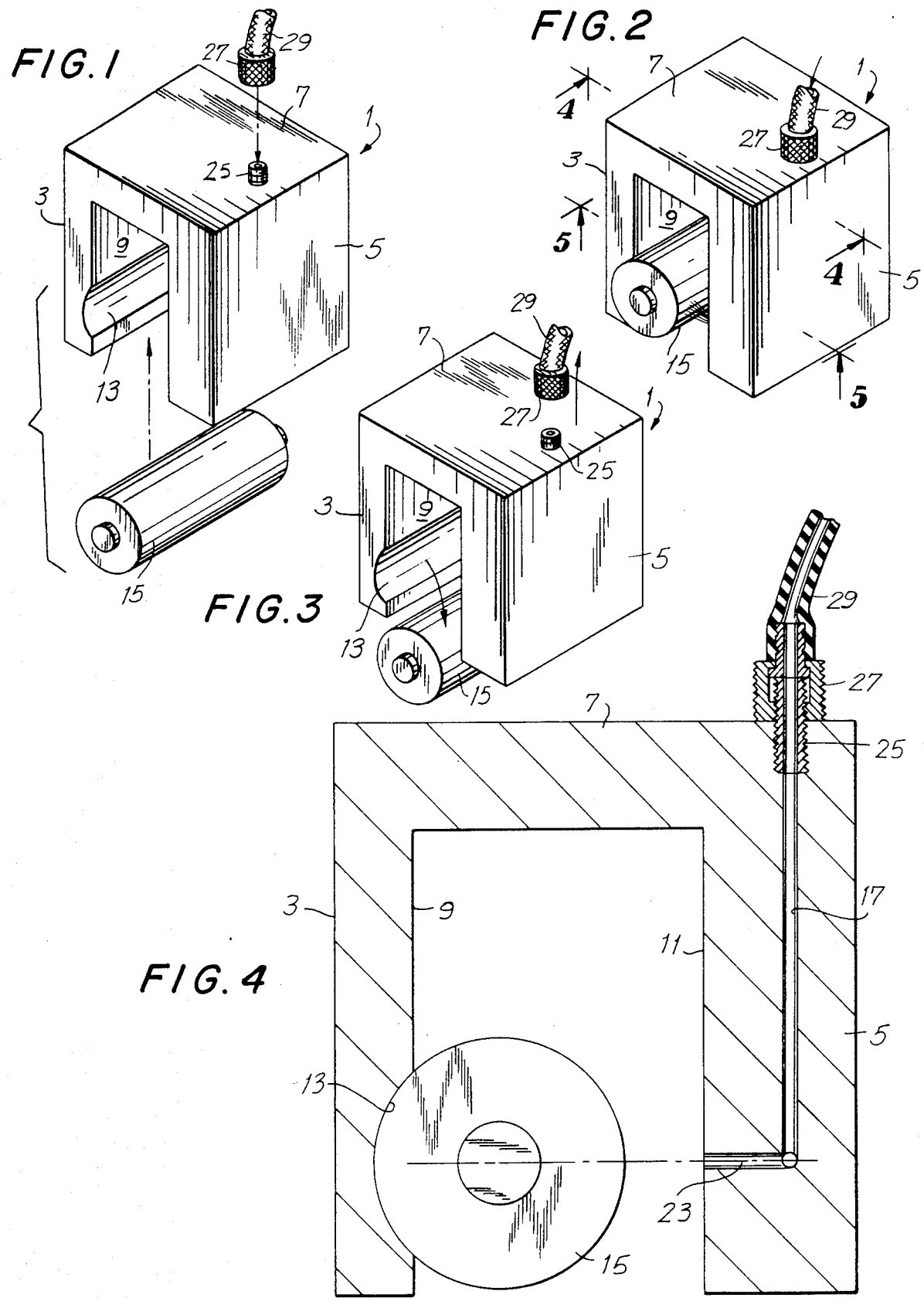

GRIPPING DEVICE

This invention relates to a gripping device. More particularly, it concerns a gripping device capable of handling pieces with special shapes that usually require special orienting devices in order to be picked up. It has special application in handling bottles with "still wet" printing as are encountered in decorating processes. It also can be applied to existing pad printers, handling objects in explosion proof areas and places with limited access.

SUMMARY OF INVENTION

The gripping device of this invention is characterized by the fact that it comprises two leg members that are spaced apart from each other whose faces oppose each other. The inner surface of one leg is provided with a cutout portion that approximately follows the shape of the object to be gripped. The opposing leg is provided on its inner surface with means for delivering a jet of gas toward the cutout located in the inner surface of the opposite leg. The object to be gripped may be positioned in the cutout of the one leg member and held in position by means of a combination of the jet of gas directed against it from the other leg member and the form support of the cutout.

DESCRIPTION OF DRAWINGS

For a further understanding of the invention, reference is made to the following description taken in connection with the accompanying drawings in which:

FIG. 1 is a perspective view of a gripping device embodied in the present invention, the object to be gripped being shown spaced away from the gripping device and the source of compressed gas being shown as being disconnected;

FIG. 2 is a view similar to that shown in FIG. 1 showing the object being grasped by the instant gripping device and the latter being connected to the source of compressed gas;

FIG. 3 is a view similar to that shown in FIG. 1 showing the object being released and the source of compressed gas being disconnected;

FIG. 4 is a longitudinal cross-sectional view of a device of this invention shown in the condition illustrated in FIG. 2 and taken along line 4—4 of FIG. 2;

DESCRIPTION OF THE INVENTION

Figure 5:
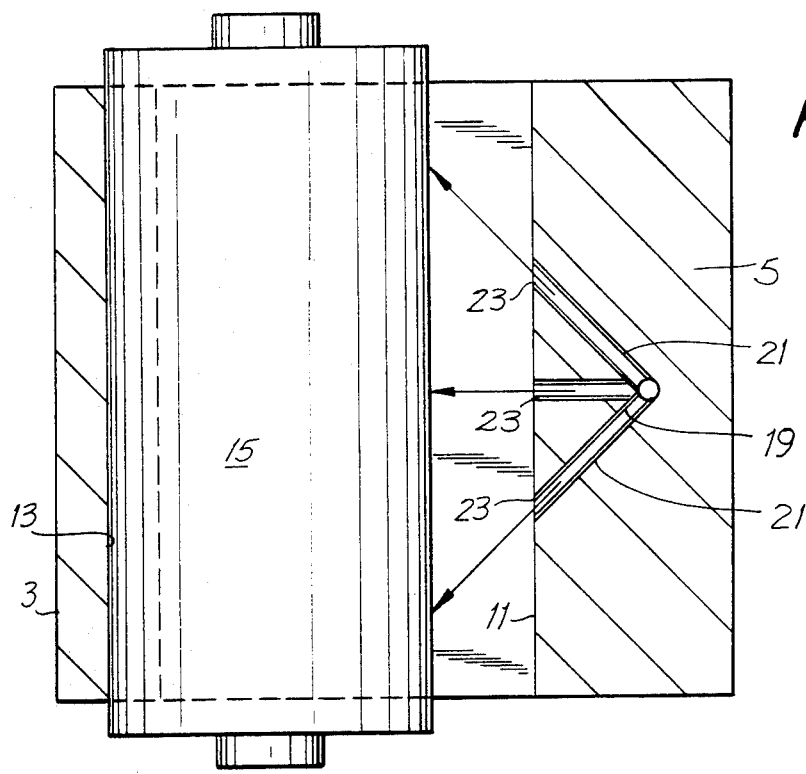
FIG. 5 is a horizontal cross-sectional view of a device of this invention shown in the condition illustrated in FIG. 2 but taken along line 5—5 of FIG. 2.

Referring to the drawings wherein the same numeral in the various views refer to the same structure, the gripping device of this invention is shown generally at 1. This comprises first and second leg members 3 and 5 respectively that are maintained in spaced relationship with respect to each other by means of a joining member 7. Each of said first and second leg members is provided with an internal surface 9 and 11 respectively.

First leg member 3 is provided on its inner face 9 with a cutout portion 13 that approximates the shape of the object 15 that will be gripped by gripping device 1. In the modification illustrated by the figures, the object to be gripped is shown generally as being cylindrical in shape. Cutout portion 13 is accordingly also shaped as part of a cylindrical surface.

Second leg member 5 is provided with a longitudinally extending gas conduit member 17 best seen in FIG. 4 which extends from above the upper surface of the gripping device down to a level opposite the cutout portion 13 in first leg member 3. In the modification illustrated in FIG. 4, this level is at the same level as a line drawn through the midpoint of cutout portion 13 in first leg member 3. Conduit 17 terminates at its lower end in a gas manifold 19 best seen in FIG. 5. In the modification illustrated, the manifold is seen as consisting of three manifold arms 21. Manifold arms 21 terminate at the inner surface 11 of second leg member 5 in manifold openings 23. Gas introduced into conduit 17 at its top exits as jets from the inner manifold openings 23. In the modification illustrated in FIGS. 1 through 5 the jets of gas are directed along a plane that bisects the object 15 that is to be gripped.

Near its upper end conduit 17 is provided with an externally threaded fixed collar 25. Collar 25 is adapted to couple with coupler 27 by which gas supply line 29 is fastened to and is in communication with conduit 17. Gas supplied to 29 is connected to any gas supply source that is maintained under pressure. A compressed air source is a suitable gas source for the present purposes.

Figure 6:
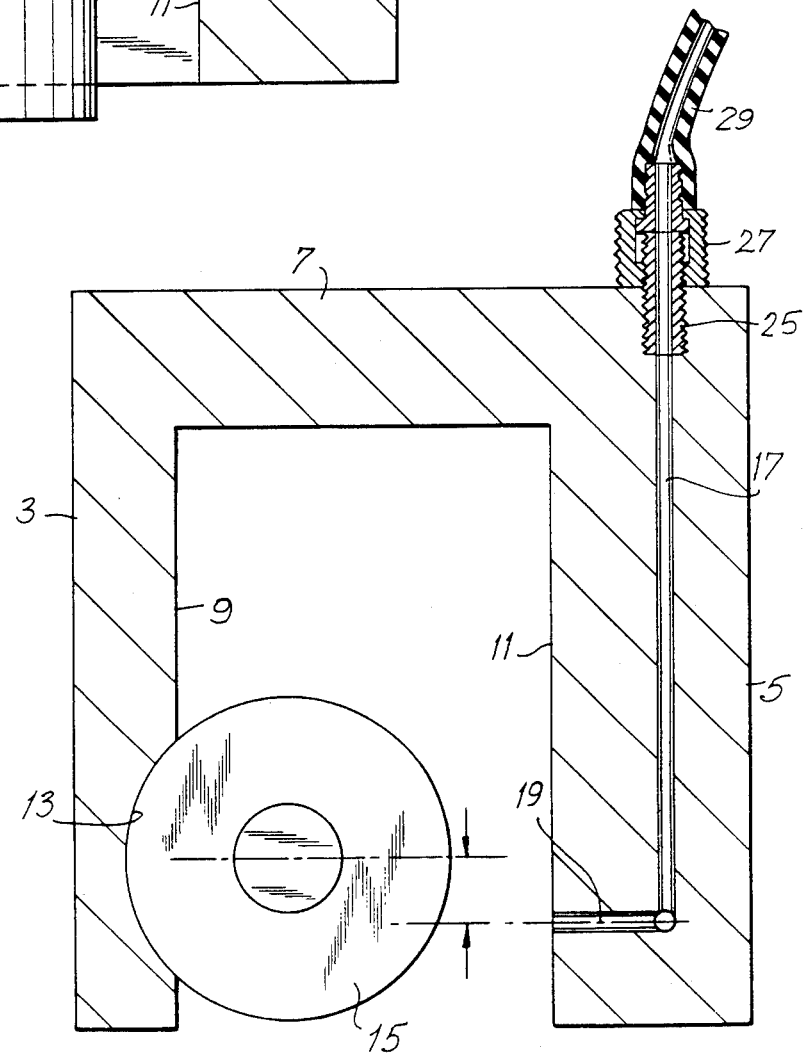
FIG. 6 is a longitudinal cross-sectional view similar to that shown in FIG. 4 but of another modification of this invention.

In the modification of this invention shown in FIG. 6 the lower end of conduit 17 and manifold arms 21 are positioned so that the plane in which the gas jets are directed towards object 15 is below the midpoint of the latter. The distance between the opposing arrows shown in this drawing indicates the distance that the plane of gas jets is displaced from the midline of object 15.

FIGS. 1 through 3 illustrate the manner by which the present gripping device operates. In FIG. 1 the gripping device is being brought close to the object 15 which is to be gripped. It will be noted that the gas supply line 29 has not yet been connected to the gripping device. In FIG. 2 the gas supply line is shown connected to the gripping device. In this case, a supply of gas preferably compressed air is being fed through gas supply line 29 to conduit 17 and out through manifold arms 21. These gas jets push object 15 into cutout portion 13 and thus, maintain object 15 in place in gripping device 1.

FIG. 3 illustrates the releasing of the object 15 from the gripping device 1. This is accomplished by cutting off the supply of compressed air or gas from gas supply line 29. This can be done by cutting off the supply at its source or by uncoupling the supply line 29 as illustrated in FIG. 3. After this is done object 15 will be released from cutout portion 13.

Although the invention has been described with reference to specific forms thereof, it will be understood that many changes and modifications may be made without departing from the spirit of this invention.

What is claimed is:

1. A gripping device for handling objects comprising first and second leg members spaced apart from each other, each of said leg members being provided with an inner surface that faces an inner surface of its opposite member;
   (a) said first leg member being provided with a cutout portion in its inner face which follows the approximate shape of the object to be gripped;
   (b) said second leg member being provided on its inner surface with means for delivering a jet of a gas toward said cutout located in the inner surface of said opposite leg;

whereby an object to be gripped may be positioned in said cutout of said first leg member and kept in said position by means of a jet of gas that is directed against it from said gas jet delivery means located on said second leg member.

2. A gripping device as set forth in claim 1 which takes the form of a "U", the legs of the "U" constituting said first and second leg members of said gripping device.

3. A gripping device as set forth in claim 2 in which said means for delivery said jet of a gas comprises a plurality of holes bored into said inner surface of said second leg member, said holes being arranged substantially in a straight line that is substantially at right angles to the long axis of said second leg member; means being contained on said gripping device for conveying said gas under pressure to said holes to generate a jet of said gas.

4. A gripping device according to claim 3 in which said holes in the inner surface of said second leg member are arranged on a straight line which is below a line drawn through the axis of said cutout in said first leg member that is substantially at right angles to the long dimension of said first leg member.

5. A gripping device according to claim 3 or 4 in which said means for delivery said jet of gas comprises an outer hole bored through the outer surface of said gripping device that communicates with the holes bored in the inner surface of said first leg member, said outer hole being provided with means for connecting it to a source of compressed gas.

* * * * *